United States Patent Office 3,660,301
Patented May 2, 1972

3,660,301
PROCESS FOR MAKING SILICA ORGANOSOLS
James F. Kovarik, Berwyn, and Peter H. Vossos, Lisle, Ill., assignors to Nalco Chemical Company, Chicago, Ill.
No Drawing. Filed Feb. 4, 1971, Ser. No. 112,813
Int. Cl. B01j *13/00*
U.S. Cl. 252—309   5 Claims

ABSTRACT OF THE DISCLOSURE

A method of preparing silica organosols which comprises: (1) dissolving a quaternary ammonium compound in a non-polar organic solvent; (2) adding an aqueous silica sol; (3) adding isopropanol; (4) thoroughly mixing; (5) separating the layers; and (6) removing the isopropanol by heat to recover the product.

INTRODUCTION

Silica organosols are well known in the art. These organosols are used in lubricating oils and greases, fillers for rubber products, and thickening agents in certain organic systems. Organosols are beneficial in preparing water repellent coatings for a variety of surfaces such as textiles, plastics, rubber and similar products.

The organosols known to those skilled in the art have many inherent disadvantages. In Iler U.S. Pat. 2,801,186 a method is shown of preparing finely divided colloidal silica dispersed in organic liquids. The process uses aqueous silica sols as starting materials. However it is necessary to work with dilute aqueous sols and to carry out various reaction steps before the end products are produced. Therefore, it would be a great advantage in the art if there was a method of producing organosols using concentrated aqueous sols and a simple one- or two-step process. These organosols would have to be stable over a long period of time.

Iler U.S. Pat. 2,692,863 teaches a process for preparing a silica organosol, using a quaternary ammonium base to coat the silica particles and extracting the coated particles from the aqueous solvent to the organic solvent. But this too contains some relevant disadvantages. A brine solution is often necessary to extract the colloidal silica particles from the aqueous to the organic solvent. Even with the brine, 100% extraction is not achieved. Other methods of removing the aqueous solvent from the composition are also undesirable. For example, azeotropic distillation could be used, but this further complicates the process of making the organosol.

Another significant disadvantage of the cited patent is that the starting materials are often expensive.

Since the organosols known to the prior art are relatively dilute, the cost of the organosols to the users is increased since transportation and packaging costs are increased due to the large percentage of the solvent present.

A further disadvantage of Iler U.S. Pat. 2,692,863 is that the aqueous silica particles are precipitated when the aqueous silica sol is added to the organic solvent. If there is a time delay, gelation or excess precipitation can result. Therefore it is necessary to complete this multistage process quickly. It would be an advantage to the art if there was no need to precipitate the silica particles from the aqueous silica solvent.

It would be a great advantage to the art if a simple means could be devised for making an organosol in a concentrated, stable condition. This process should be rapid and contain as few steps as possible. There should also be a means of easily separating the aqueous from the organic solvent. It would be a further advantage to the art if the organosol could be easily concentrated without causing gelation or precipitation of the colloidal silica particles. The organic solvent should be capable of being easily removed so that oleophilic silica powders could be formed. Such powders should be easily redispersed in organic solvents.

An easy method of preparing organosols is disclosed in a copending application Ser. No. 807,107, filed Mar. 13, 1969. This method involves coating silica sol particles with a specific coating compound in a non-polar, aliphatic organic hydrocarbon solvent containing from 5 to 10 carbon atoms. One of the main disadvantages of this is that only a few solvents, such as hexane and a few specific coating compounds, such as tricaprylyl methyl ammonium chloride could be used. There is a need in the art to develop a method which allows use of many different solvents and coating compounds.

OBJECTS

It is an object of this invention to prepare stable organosols which contain a high concentration of silica particles.

Another object is to prepare an organosol by using an aqueous silica sol without the need to precipitate the silica particles. A simple process should be devised so that the silica particles can be essentially extracted from the aqueous layer into an organic solvent without going through the step of precipitation and redispersion.

A further object is to provide an easy method for separating the aqueous layer from the organosol product without the need for a brine solution or azeotropic distillation.

Another object is to prepare an organosol which can be easily concentrated by evaporation of some of the organic solvent or even by evaporation of all of the organic solvent to produce dry, free flowing, oleophilic silica powders.

A further object is to provide a method of preparing organosols which can be used with a large variety of solvent. Another object is to provide a method of preparing organosols which can utilize a variety of quaternary ammonium salts or hydroxides.

Further objects will be revealed in this description and should be readily apparent to those skilled in the art.

INVENTION

The products produced are silica organosols consisting of an organic solvent which contains uniformly dispersed therein discrete, dense colloidal particles of amorphous silica. The organic solvent is nonpolar and aliphatic. In this organic solvent are uniformly dispersed discrete, dense colloidal particles of amorphous silica. These silica particles are from 0.1% to 50% by weight of the total composition. These silica particles have an average particle diameter of from 3 to 150 millimicrons and an average surface area of from 20 m.²/g. to 1000 m.²/g. These silica particles have adsorbed upon their surfaces a quaternary ammonium salt or hydroxide.

The quaternary ammonium compound has the formula:

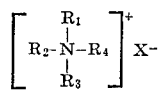

where $R_1$, $R_2$, $R_3$, and $R_4$ are hydrocarbon groups containing from 1–22 carbon atoms each, and X is an anion selected from the group consisting of chloride, bromide, iodide, and hydroxide. As will be noticed, the total number of carbon atoms of the quaternary should be at least 10 and more often at least 14. The hydrocarbon groups can be straight or branch chained, saturated or unsaturated, aliphatic or aromatic.

Thus, $R_1$, $R_2$, $R_3$ and $R_4$ in the above formula may be any hydrocarbon radical such as methyl, ethyl, propyl, n-butyl, t-butyl, amyl, hexyl, heptyl, octyl, caprylyl, lauryl, myristyl, palmityl, stearyl, oleyl, etc. In many instances the quaternary amines are derived from mixtures of fatty acids that occur in various fats and oils, such as coconut oil, hydrogenated tallow, castor oil, hydrogenated castor oil, etc. Thus, in such cases, the R groups will be mixed.

The solvent for the silica and adsorbed quaternary may be any appropriate organic solvent which when combined with the silica and quaternary ammonium compound forms an appropriate organosol. Thus, solvents such as aliphatic hydrocarbons for instance, pentane, hexane, heptane, octane, nonane, isooctane, decane, pentyne, aromatic solvents such as toluene, and chlorinated hydrocarbons such as perchloroethylene may be used.

A preferred solvent for the silica is a straight or branched chain hydrocarbon oil such as a vegetable oil, animal oil, marine oil, mineral oil, or a synthetic oil. Preferably, oils of relatively low viscosity are employed.

The amount of the quaternary amine in relation to the silica depends upon the particle size of the colloidal silica. The smaller the particle size, the more quaternary will be required. In general, the ratio of $SiO_2$ to quaternary will be from 25:1 to 2:1. For an average particle diameter of 20 millimicrons a ratio of about 6:1 should be used.

The organosol by itself can be a useful product. However, the solvent can be removed and a dry free flowing powder recovered. This powder can be redissolved in organic solvents to give back an organosol. The quaternary ammonium salt or hydroxide could be tricaprylyl benzyl ammonium salt, dicaprylyl dimethyl ammonium salt, tricaprylyl ethyl ammonium salt, tetracaprylyl ammonium salt, or various other quaternary ammonium salts or hydroxides known to those skilled in the art. The hydroxide form of the quaternary ammonium salts can be easily prepared by passing a 50% solution of the chloride form in isopropanol through an anion exchange column in the OH-form. Preferably, the quaternary ammonium compounds which may be adsorbed on the silica particles are dicoco dimethyl ammonium chloride, dihydrogenated tallow dimethyl ammonium chloride, lauryl trimethyl ammonium chloride and others.

The process comprises the steps of:

(1) Dissolving a quaternary ammonium compound having the formula:

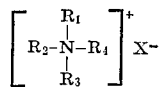

wherein $R_1$, $R_2$, $R_3$ and $R_4$ are hydrocarbon groups containing 1–22 carbon atoms, with the total number of carbon atoms in said quaternary ammonium compound being at least 10, and X is an anion selected from the group consisting of chloride, bromide, iodide and hydroxide; in a non-polar organic solvent.

(2) Mixing the above solvent containing salt with an aqueous silica sol having an average particle diameter of 3 to 150 millimicrons and an average surface area of from about 20 m.$^2$/g. to 1000 m.$^2$/g.

(3) Adding from 15 to 50% isopropanol as a cosolvent.

(4) Mixing thoroughly.

(5) Separating the organic layer from the aqueous layer.

(6) Removing the isopropanol by heat to recover as a product the organic layer which is an organosol containing a non-polar, organic solvent having uniformly dispersed therein from 0.1% to 50% by weight of discrete, dense colloidal particles of amorphous silica having an average particle diameter of from 3 to 150 millimicrons and an average surface area of from 20 m.$^2$/g. to 1000 m.$^2$/g., wherein said silica particles have absorbed upon their surfaces the quaternary ammonium salt or hydroxide.

The most significant improvement in this application is the addition of isopropanol to act as a cosolvent to achieve essentially complete extraction. The isopropanol used varies from 15 to 50% by weight based on the weight of the non-polar organic solvent. The mixture is stirred for about 5 to 60 minutes.

The mixture obtained in this process is allowed to separate into an organic and an aqueous layer.

Means for speeding up separation of oil and water phase would be either resort to centrifugation or application of an electrical potential across the system. The aqueous layer can be withdrawn and discarded, since the bottom layer which is the organic layer now contains the coated silica particles.

After two layers are separated, the product layer is heated to 60 to 80° C. for 2 to 120 minutes to drive off the alcohol and clarify the product. The isopropanol is thus removed by heating the organic phase to about 60° C. for a short time.

From 98 to 100% of the silica particles are extracted into the organic phase. The organic layer is now our finished product which is an organosol containing from 0.1 to 50% by weight of the discrete, dense colloidal particles of amorphous silica which have been coated with quaternary ammonium salt or hydroxide.

The temperature for carrying out the process of this invention can range from 20 to 70° C. Essentially, this reaction can be carried out at any temperature from about room temperature to the boiling point of the organic solvent.

If a higher concentration of the silica particles in the organic solvent is desired, the organosol can be concentrated by merely evaporating some of the organic solvent from the finished product. If a free flowing, dry silica powder is desired, which can be readily dispersed in other organic solvents, all of the organic solvent of the organosol is evaporated. The result is discrete, dense silica particles with uniformly coated surfaces of quaternary ammonium salt or hydroxide.

STARTING AQUEOUS SILICA SOLS

Generally, any aqueous silica sol can be used for this invention. These are well known to the art. The starting aqueous silica sol can range from 20 to 60% by weight of discrete, dense colloidal particles of amorphous silica. The average particle diameter can range from 3 to 150 millimicrons and can have an average surface area from 20 m.$^2$/g. to 1000 m.$^2$/g. It is preferred that the starting aqueous silica sol be from 30 to 50% by weight of discrete, dense colloidal particles of amorphous silica. The preferred particle diameter should range from 16 to 20 millimicrons and have an average surface area from 150 m.$^2$/g. to 190 m.$^2$/g.

The following is a table of commercially available aqueous silica sols. These are sold by Nalco Chemical Company under the trademark Nalcoags.

TABLE I

| Nalcoag | 1030 | 1034A | 1035 | 1050 | 1060 | 1130 | 1140 |
|---|---|---|---|---|---|---|---|
| Percent colloidal silica, as $SiO_2$ | 30 | 34 | 35 | 50 | 50 | 30 | 40 |
| pH | 10.2 | 3.1 | 8.6 | 9.0 | 8.5 | 10 | 10 |
| Average particle size, millimicrons | 11–16 | 16–22 | 16–22 | 17–25 | 40–60 | 8 | 15 |
| Average surface area, m.²/gram | 190–270 | 135–190 | 135–190 | 120–176 | 50–75 | 375 | 200 |
| Specific gravity at 68° F | 1.205 | 1.230 | 1.255 | 1.385 | 1.390 | 1.214 | 1.296 |
| Viscosity at 77° F., cps | (¹) | (¹) | 5 | 70 | 5–10 | 7 | 8 |
| $Na_2O$ percent | 0.40 | (²) | 0.10 | 0.30 | 0.10 | 0.65 | 0.40 |

¹ Less than 5.
² Less than 0.01%.

EXAMPLES

In order that the invention may be better understood the following specific illustrative examples are given.

Example I

To 33.5 grams of a branched hydrocarbon oil having a boiling point of 280 to 350° C. was added 4.5 grams of dimethyldihydrogenated tallow ammonium chloride with mixing. Complete dissolution did not occur. While mixing, 50.0 parts of Nalcoag 1050 was added, followed by 12.0 grams of isopropanol. All the materials were mixed for 5 minutes. Mixing was stopped and one hour was allowed for separation. The bottom layer which was cloudy was drawn off as the product and heated at 85° C. for 1½ hours. The isopropanol was thus removed. The resulting material was a clear amber-colored sol containing 40% silica.

Example II

This example was run exactly like Example I except kerosene was substituted for the branched hydrocarbon oil. The product was similar.

Example III

This example was run exactly like Example I except perchloroethylene was substituted for the branched hydrocarbon oil. The product was similar.

Other Nalcoags such as 1034A, 1035, 1060, and 1130 could be used. More concentrated silica sols may also be possible.

Example IV 112.5 grams of dihydrogenated tallow dimethyl ammonium chloride was added to 787.5 grams of xylene with mixing. While mixing, 1205 grams of Nalcoag 1050 was added followed by 353.5 grams of isopropanol. After all of the materials were thoroughly mixed, the mixing was stopped and the layers separated. The bottom product layer was cloudy, was withdrawn, and heated to 75° C. to remove the isopropanol. The product was clear.

What is claimed and desired to be protected by Letters Patent is:

1. A process for making an organosol which comprises the steps of:
   (A) dissolving a quaternary ammonium compound having the formula:

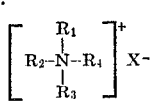

wherein $R_1$, $R_2$, $R_3$ and $R_4$ are hydrocarbon groups containing 1–22 carbon atoms, with the total number of carbon atoms in said quaternary ammonium compound being at least 10, and X is an anion selected from the group consisting of chloride, bromide, iodide and hydroxide; in a non-polar organic solvent;
   (B) mixing the above solvent containing salt with an aqueous silica sol having an average particle diameter of 3 to 150 millimicrons and an average surface area of from about 20 m.²/g. to 1000 m.²/g.;
   (C) adding from 15 to 50% by weight isopropanol as a cosolvent;
   (D) mixing thoroughly;
   (E) separating the organic layer from the aqueous layer; and then
   (F) removing the isopropanol by heat to recover as the product the organic layer which is an organosol containing a non-polar, organic solvent having uniformly dispersed therein from 0.1% to 50% by weight of discrete, dense colloidal particles of amorphous silica having an average particle diameter of from 3 to 150 millimicrons and an average surface area of from 20 m.²/g. to 1000 m.²/g., wherein said silica particles have absorbed upon their surfaces the quaternary ammonium salt or hydroxide.

2. The process of claim 1 wherein the non-polar aliphatic organic solvent is a branched hydrocarbon oil having a boiling point of 208 to 350° C.

3. The process of claim 1 wherein the discrete, dense colloidal particles of amorphous silica have an average particle diameter of from 16 to 20 millimicrons and an average surface area of from 150 m.²/g. to 190 m.²/g.

4. The process of claim 1 wherein the weight ratio of silica, expressed as $SiO_2$, to quaternary ammonium salt or hydroxide is 6:1.

5. The process of claim 1 wherein the quaternary ammonium salt is dihydrogenated tallow dimethyl ammonium chloride.

References Cited

UNITED STATES PATENTS 2,692,863  10/1954  Iler _____ 252—309

JOHN D. WELSH, Primary Examiner